United States Patent
Sato

[11] Patent Number: 6,124,904
[45] Date of Patent: Sep. 26, 2000

[54] LIQUID CRYSTAL DISPLAY DEVICE

[75] Inventor: Hajime Sato, Yokohama, Japan

[73] Assignee: Kabushiki Kaisha Toshiba, Kawasaki, Japan

[21] Appl. No.: 08/359,840

[22] Filed: Dec. 20, 1994

Related U.S. Application Data

[63] Continuation of application No. 07/996,005, Dec. 23, 1992, Pat. No. 5,446,562.

[30] Foreign Application Priority Data

Dec. 25, 1991  [JP]  Japan ................................ 3-342604

[51] Int. Cl.$^7$ .................... G02F 1/136; G02F 1/1333; G02F 1/1343
[52] U.S. Cl. ................. 349/43; 349/110; 349/143
[58] Field of Search .................... 359/59, 57, 58, 359/67

[56] References Cited

U.S. PATENT DOCUMENTS

| 5,130,829 | 7/1992 | Shannon ..................................... | 359/59 |
| 5,353,135 | 10/1994 | Edwards ..................................... | 359/55 |
| 5,372,958 | 12/1994 | Miyasaka et al. ......................... | 437/40 |

FOREIGN PATENT DOCUMENTS

| 0136509 | 4/1985 | European Pat. Off. . |
| 56-107287 | 8/1981 | Japan . |
| 60-45219 | 3/1985 | Japan . |
| 60-66288 | 4/1985 | Japan . |
| 1-024232 | 1/1989 | Japan . |
| 1-156725 | 6/1989 | Japan . |
| 3-175430 | 7/1991 | Japan . |

OTHER PUBLICATIONS

Patent Abstracts of Japan, vol. 15, No. 426 (Oct. 29, 1991), abstract of JP 3–175430 (Jul. 30, 1991).

Patent Abstracts of Japan, vol. 13, No. 203 (May 15, 1989), abstract of JP 1–024232 (Jan. 26, 1989).

*Primary Examiner*—William L. Sikes
*Assistant Examiner*—Dung Nguyen
*Attorney, Agent, or Firm*—Pillsbury Madison & Sutro Intellectual Property Group

[57] ABSTRACT

A liquid crystal display device includes an array substrate, an opposing substrate, and a liquid crystal layer sealed between the substrates. The array substrate has signal and scanning lines arranged in a matrix manner, and a plurality of pixel electrodes each connected to the signal and scanning lines through a transistor. A conductive film covers the signal and scanning lines through an insulating film. Each pixel electrode has an edge portion overlapping with the conductive film through an insulating film.

27 Claims, 10 Drawing Sheets

LIQUID CRYSTAL DISPLAY DEVICE

This application is a continuation of application Ser. No. 07/996,005 filed Dec. 23, 1992, now U.S. Pat. No. 5,446,562.

BACKGROUND OF THE INVENTION

1. Field of the Invention

The present invention relates to a liquid crystal display device used for in a projection display television and more particularly to a fine or small-sized liquid crystal display device having a pixel size of about 100 µm or less.

2. Description of the Related Art

In recent years, the liquid crystal display device has been used in various fields in view of using the various features such as light weight, low consumption cost of electric power, and the like. In particular, attention has been paid to a liquid crystal display device, which drives each pixel electrode through a switching element and provides a good display without crosstalk.

This type of liquid crystal device comprises an array substrate and an opposing substrate which are spaced apart from each other by a distance of about 5 µm, and having a liquid crystal layer sealed between these substrates. Signal lines to which image signal are applied and scanning lines to which ON-OFF control signals (scanning signals) for switching transistors are applied are formed on the array substrate in a matrix manner. Pixel electrodes are respectively formed in the areas enclosed with the signal lines and the scanning lines, and each pixel electrode is connected to the corresponding signal line through the switching transistor. If an ON signal is applied to the scanning line, the switching transistors connected to the scanning line are turned on, and each electrical potential of the signal line is supplied to the pixel electrode formed of a transparent conductive film.

Storage electrodes extending in parallel to the scanning lines are formed on the array substrate. Each storage electrode forms a MOS capacity between a part of the pixel electrode and the storage electrode in order to suppress the variation of the pixel potential, which is caused by crosstalk between the signal lines or the scanning lines and the pixel electrode and leak current at the switching transistor.

A transparent conductive film is formed on the entire surface of the opposing substrate, and a light-shielding film is formed thereon to define the opening area of the display device.

In the above-explained liquid crystal display device, the size of each pixel is about 60 µm×60 µm. However, smaller or finer liquid crystal display devices are required, and to achieve such, it is necessary that the pixel size be further reduced.

However, the reduction of the pixel size causes various problems, and the following two major problems can be particularly explained.

One problem is that a coupling capacitance rapidly increases as the distance between the signal line and the pixel electrode is narrowed, so that crosstalk is generated between the pixel electrode and the signal line and the pixel potential is varied.

The other problem is that disorder of the orientation of a crystal liquid occurs along the signal line by a lateral electrical field generated between the signal line and the pixel electrode. Since the disorder of the orientation of the crystal liquid ranges from the signal line to 7 to 15 µm, the problem becomes more serious if the pixel size is reduced.

The above problems can be solved by sufficiently widening the space between the signal line and the pixel electrode.

However, if the space between the signal line and the pixel electrode is widened in addition to the reduction of each pixel size, the aperture ratio ((area through which light can transmit)/(pixel area)) is considerably lowered, and the image on the screen becomes extremely dark.

On the other hand, in recent years, the coloring of the liquid crystal display device to be used in a view finder and a head-up display and the like has been advanced. In projection display televisions, images can be colored by using dichroic mirrors for performing color separation and three monochrome liquid crystal display devices. However, in the case of the view finder or the head-up display, since there is no space for arranging a complicated optical system, it is required that color display can be performed by a single liquid crystal display device. To achieve this object, normally, the liquid crystal display device is colored by using a color filter formed on the opposing substrate.

However, if the pixel pitch is reduced in accordance with the miniaturization of the pixel, it is difficult to correctly align the color filter on the opposing substrate with the pixels on the array substrate.

SUMMARY OF THE INVENTION

The present invention has been made in consideration of the above-mentioned problems, and its object is to provide a liquid crystal display device wherein a sufficient aperture ratio can be ensured even if the pixel size is small, and neither variation of the pixel potential due to crosstalk between the pixel electrodes and wirings nor disorder of an orientation of crystal liquid occur along the wirings.

In order to achieve the above object, a liquid crystal display device according to the present invention comprises a first electrode substrate having a plurality of signal lines and scanning lines arranged in a matrix manner and a plurality of pixel electrodes each of which is connected to the signal and scanning lines through a switching element; a second electrode substrate having opposing electrode which is opposite to the pixel electrodes; and a liquid crystal layer sealed between the first and second electrode substrates. A conductive film is arranged between at least one of the signal line and the scanning line and each pixel electrode through an insulating film.

Moreover, the liquid crystal display device of the present invention has a plurality of color filters formed on the insulating film to be opposite to the respective pixel electrodes.

As mentioned above, in the conventional liquid crystal device, variation of the pixel potential, which is caused by crosstalk between the signal lines and the pixel electrodes, and the disorder of the orientation of liquid crystal generated along the signal lines, occurs in accordance with the reduction of the pixel size.

The inventor of the present invention variously reviewed the above-mentioned technical problems, and found out that the technical problems can be solved by structuring the liquid crystal display device as mentioned above.

Specifically, according to the liquid crystal display device of the present invention, the conductive film is formed between each pixel electrode and at least one of the signal line and the scanning line through the insulating film. For example, in case that the conductive film is formed between the signal line and the pixel electrode, a coupling capacitance between the signal line and the pixel electrode can be set to substantially 0, and crosstalk between the signal line and the pixel electrode can be reduced. Moreover, regarding the disorder of the orientation of liquid crystal caused along the signal line, since the pixel electrode and the signal line are electrically shielded from each other by the conductive film, the lateral electric field generated from the signal line is reduced. In a case wherein the conductive film is formed between the scanning line and the pixel electrode, crosstalk between the scanning line and the pixel electrode can be reduced.

A lateral electric field is generated between the two adjacent pixel electrodes by the potential difference between the pixel electrodes. However, in a case wherein a normal scanning method (frame inversion driving method: polarity of an image signal is reversed every one frame) is used, a signal voltage difference between the pixel electrodes is 4V or less in an effective value, and the edge portions of the pixel electrode are electrically shield by the conductive film through the shielding film. Thus, the lateral electrode acting on the pixel electrodes is small, the disorder of the orientation of liquid crystal can be made reduced to the extent that no influence is exerted on an image quality.

In a case wherein an opaque conductive film is used as the conductive film and covers the signal lines, the scanning lines, and the switching elements, the opaque conductive film serves as a light-shielding film (black matrix), which is independently formed on the opposing substrate in convention. Thereby, even if the pixel size is made small, it is unnecessary to align the second electrode substrate with the first electrode substrate with high precision, and the manufacturing process can be simplified, thereby improving the productivity of the device.

Further, if a transparent conductive film is used as the conductive film, the aperture ratio of the display device can be largely improved.

Moreover, the conductive film and a part of the pixel electrode is arranged to overlap with each other through the insulating film, so that a capacitor can be formed on the overlapped portion. This capacitor can be used as a storage capacity. Therefore, there is no need to separately provide storage electrodes. Moreover, by using a transparent conductive film, that portion of the pixel electrode which constitutes the storage capacitor can also function as a pixel. Accordingly, even if the pixel size is made small, the aperture ratio of the liquid crystal display device can be increased. Since a part of the conductive film forms a liquid crystal cell associated with the opposing electrode, it is preferable that the potential of the conductive film be set to be the same as that of the opposing electrode so as not to cause image striking.

According to the present invention, as the pixel size is decreased, a writing characteristic of the image signal and a rising/falling characteristic of the scanning signal tend to be improved. Conversely, if the pixel size is increased, the distribution capacitance of the signal line and the scanning line are rapidly increased in accordance with the increase in the area of the matrix lines when the thickness of the insulating film is fixed, and there is fear of deteriorating the writing characteristic of the image signal and the rising/falling characteristic of the scanning line. According to the study of the present inventor, the respective characteristics are within a considerably wide range, depending on the scanning method or wiring material. There occurs a problem in the deterioration of the electric characteristics if the pixel size is about 100 $\mu$m in case of NTSC system and 60 $\mu$m or more in case of a high definition system.

However, by contriving the scanning method or the wiring material, a large technical advantage can be brought about in the large pixel size without limiting to the above-mentioned pixel size.

Moreover, according to the present invention, since the color filter is formed on the first electrode substrate, it is possible to align the color filter and the pixels with high precision. In contrast, it is unnecessary to align the first and second electrode substrates with high precision, thereby making it easy to manufacture the liquid crystal display device.

Additional objects and advantages of the present invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 8 show a liquid crystal display device according to a first embodiment of the present invention, in which:

DETAILED DESCRIPTION OF THE PREFERRED EMBODIMENTS

Embodiments of the present invention will be explained with reference to the accompanying drawings.

Figure 1:
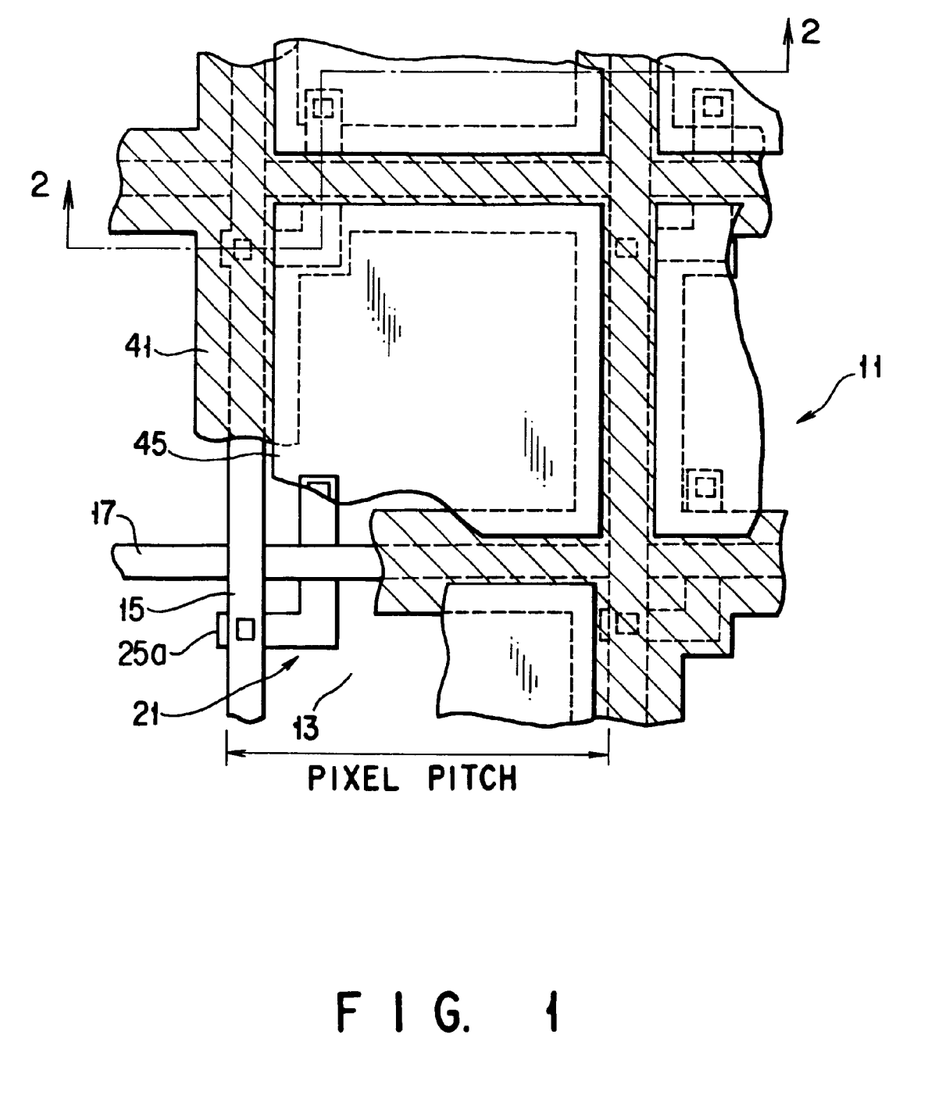
FIG. 1 is a plane view of a part of an array substrate of the liquid crystal display device, viewed from an opposing substrate side.
Figure 2:
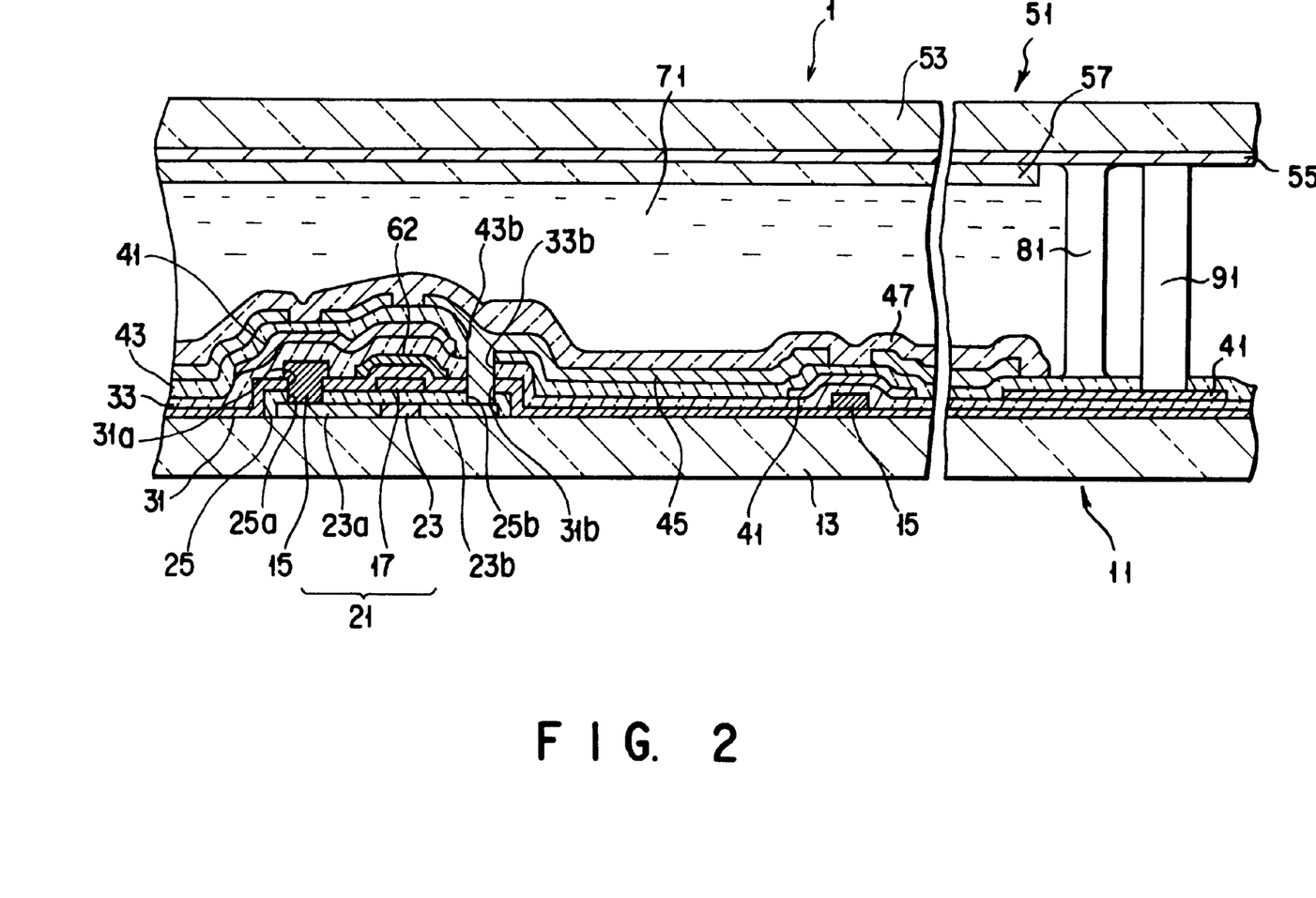
FIG. 2 is a schematic cross sectional view taken along a line 2—2 FIG. 1.

As shown in FIGS. 1 and 2, a liquid crystal display device 1 according to a first embodiment of the present invention comprises an array substrate 11 serving as a first electrode substrate, an opposing substrate 51 serving as a second electrode substrate, and a liquid crystal layer 71 sealed between these substrates.

The array substrate 11 comprises a substrate 13 formed of transparent quartz, and a plurality of signal lines 15 and scanning lines 17 which are formed on the substrate 13 in a matrix manner. Each signal line 15 is formed of aluminum and has a line width of 5 μm, and an image signal is sent to the signal line 17 with a pitch of 50 μm. Each scanning line 17 is formed of a polycrystalline silicon film in which impurity is doped to lower its resistance, and has a line width of 5 μm. An ON-off control signal (scanning signal) of a switching transistor 21 to be described later is sent to the scanning line 17. It is noted that aluminum—silicon (Al—Si) other than aluminum may be used as a material for the signal line 15.

At each crossing portion of the signal lines 15 and the scanning lines 17, there are provided a switching transistor 21 which has a W/L=5/5 μm and an active layer comprised of a polycrystalline silicon film 23.

On the polycrystalline silicon film 23 of the switching transistor 21 is provided the scanning line 17 through a gate insulating film 25 which is formed by thermally oxidizing a part of the polycrystalline silicon and has a thickness of 700Å. After forming the scanning lines 17, an activator is implanted in the polycrystalline silicon film 23 by ion-implantation (self-aligning method) while using the scanning lines as a mask. As a result, a source region 23a and a drain region 23b are formed in the silicon film 23. In this case, the lengths of diffusion of the source and drain regions 23a and 23b n the direction L are set to be 0.3 μm.

It is possible to use a deposition film, which is prepared by AP (Atmosphere Pressure)-CVD, as the gate insulating film 25 other than the thermal oxidation film.

A first interlayer insulating film 31 is formed on the substrate 13 to cover the gate insulating film 25 and the scanning lines 17. The signal electrode 15 is connected to the corresponding source region 23a through contact holes 25a and 31a, which are respectively formed in the gate insulating film 25 and the first interlayer insulating film 31, whereby the switching transistor 21 is structured. It can be considered that amorphous silicon is used as an active layer of the switching transistor 21. However, the size of the transistor must be made small in order to increase the aperture ratio by a small pixel size. For this reason, the semiconductor thin film preferably has a high mobility, and thus, particularly, polycrystalline silicon film may be used.

The polycrystalline silicon film 23 can be formed by the well-known LP (Low Pressure)-CVD, plasma CVD, sputtering, and the like. As a method for forming the polycrystalline silicon film 23, the following methods are useful for obtaining a polycrystalline silicon film which has a high mobility: a method having the steps of forming an amorphous silicon film, annealing the film with a solid-phase-grown at about 600° C. (solid phase crystallization), and polycrystallizing the film; a method having the steps of inplanting a silicon ion into an amorphous silicon film, and annealing the amorphous silicon film with a solid-phase-grown; and a method having the steps of irradiating a laser beam on an amorphous silicon film to recrystallize the film.

Moreover, in order to reduce the leak current at the time when the switching transistor 21 is off, the following methods are useful: a method of reducing effect states in a drain junction by hydrogenation and the like; and a method of decreasing an electrical field in the drain junction by using a LDD structure.

According to this embodiment, a second interlayer insulating film 33 having a thickness of 5000 Å is formed on the first interlayer insulating film 31 to cover the signal lines 15. Further, an opaque conductive film 41, serving as a conductive film of the present invention, is formed on the second interlayer insulating film 33 to cover the signal lines 15, the scanning lines 17 and the switching transistors 21. The opaque conductive film 41 is formed in a network structure in correspondence with the signal and scanning lines 15 and 17. The width of each portion of the opaque conductive film 41 is sufficiently larger than the width of the signal line and the scanning line. The opaque conductive film 41 is formed of aluminum similar to the signal line 15, and connected to a fixed potential, for example, the potential of an opposing electrode 55 (described later). In this case, end portions of the opposing electrode 55 and conductive film 41 are exposed at the outside of a sealing member 81 and electrically connected to each other by means of a conductive paste 91. Generally, opposing electrode 55 is connected to a drive circuit on the array substrate 11 side through the conductive paste 81, so that the electrical connection between the opposing electrode 55 and the conductive film 41 can be easily obtained.

In order to improve a shielding property, it is useful to use a chromium (Cr) film, a silicide film such as a tungsten silicide, or aluminum/chromium (Al/Cr) film as the opaque conductive film 41.

A third interlayer insulating film 43 having a thickness of 2000 Å, serving as an insulating film of the present invention, is formed on the second interlayer insulating film 33 to cover the opaque conductive film 41.

The above-mentioned second and third interlayer insulating films 33, and 43 can be formed of an insulating film, which can be formed at low temperature not to damage the metal thin film, such as an LTO (Low Temperature Oxide) film prepared by AP-CVD method or LP-CVD method.

In each pixel area enclosed with the signal lines 15 and the scanning lines 17, a pixel electrode 45 formed of ITO (Indium-Tin-Oxide) is provided on the third interlayer insulating film 43. The pixel electrode 45 is connected to the drain region 23b of the switching transistor 21 through contact holes 25b, 31b, 33b, 43b which are formed in the first to third interlayer insulating films 31, 33, 43, and the gate insulating film 25. Each pixel electrode 45 is formed in a size substantially equal to that of the pixel area, and the edge portion of the pixel electrode is arranged to overlap with the peripheral area of the opaque conductive film 41 of 5 μm through the third interlayer insulating film 43.

Moreover, an orientation layer 47 formed of polyimid and processed to be oriented in a predetermined direction is formed on the pixel electrodes 45, whereby the array substrate 11 is structured.

The opposing substrate 51 comprises a transparent glass substrate 53 and a transparent conductive film 55 formed on the whole surface of the glass substrate and serving as an opposing electrode. An orientation film 57 formed of polyimid and processed to be oriented in a predetermined direction is provided on the transparent conductive film 55.

The array substrate 11 and the opposing substrate 51 are arranged to be opposite to each other with a gap of about 5 µm, and the liquid crystal layer 71 is sealed between these substrates.

According to the above-structured liquid crystal display device 1 of this embodiment, those portions of the opaque conductive film 41 and the pixel electrode 45 which overlap each other form a parallel plane capacitor which is used as a storage capacitor. Due to this, even if the pixel pitch is extremely small, as 50 µm, an, extremely high aperture ratio of 47% can be ensured.

In convention, a polysilicon film to which impurity is doped was used as a storage electrode. According to this embodiment, however, since the opaque conductive film 41 is used in place of the polysilicon film, a wiring resistance can be largely reduced, and the writing characteristic of the image signal can be improved.

According to the liquid crystal display device 1 of the above embodiment, if the gate voltage is set within a range of 0 to 16V, and the signal voltage is set within a range of 1 to 9V, the transistor characteristics has an ON resistance of 63 (k.Ω) and an OFF resistance is $8.0 \times 10^{13}$ (Ω) under W/L=3/3, so that a high ON/OFF ratio can be obtained.

Moreover, according to the liquid crystal display device, the opaque conductive film 41 is provided between the signal lines 15 and the pixel electrode 45, and is connected to the fixed potential or the potential of the opposing electrode 55. Due to this, the coupling capacitance between the signal lines 15 and the pixel electrode 45 can be reduced to substantially 0. Even if the pixel pitch is made small and the space between the signal lines and the pixel electrode is made small, therefore, crosstalk between the signal line 15 and the pixel electrode can be prevented. As a result, the aperture ratio of the liquid crystal display device 1 can be improved. Similarly, the coupling capacitance between the scanning lines 17 and the pixel electrode 45 can be reduced, and crosstalk between the scanning line 17 and the pixel electrode can be made small.

Since the pixel electrode 45 and the signal line 15 are electrically shielded from each other by means of the opaque conductive film 41, the disorder of the orientation of the liquid crystal at the end portion of the pixel electrode 45 due to the lateral electrical field generated from the signal line can be reduced to the extent where no influence is exerted on the quality of the image.

In this embodiment, since the opaque conductive film 41 covers the signal lines 15, the scanning lines 17 and the switching transistors 21, there is no need for a light-shielding film to be separately formed on the opposing substrate 51. Therefore, it is not necessary to align the array substrate 11 with the opposing substrate 51 with high precision. Then, even if the pixel size is further made fine, the liquid crystal display device can be easily manufactured.

The following will explain various characteristics of the liquid crystal display device 1 when the pixel pitch of the device 1 is varied, with reference to FIGS. 3 to 8. It is assumed that the width of each line, the distance between the lines, and the length of the gap between the substrates are proportional to the pixel pitch.

Figure 3:
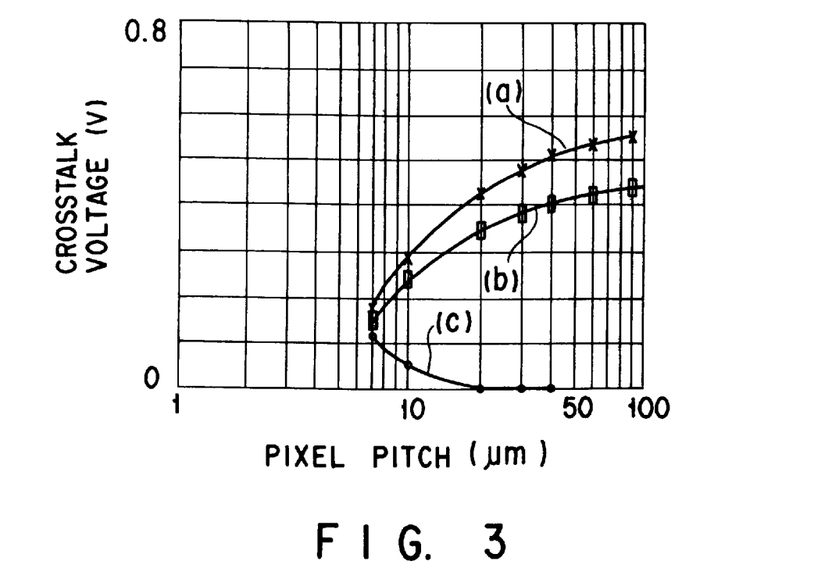
FIG. 3 is a view showing the relationship between a crosstalk voltage and a pixel pitch.

FIG. 3 shows dependence of the pixel pitch with respect to crosstalk voltage (pixel potential variation) due to the signal line 15 and the scanning line 17 of the liquid crystal display device 1.

The crosstalk voltage due to the scanning line 17 shows the variation of the pixel potential due to an electrical charge under the gate electrode (scanning line 17) when the switching transistor 21 changes to OFF from ON and the parasitic capacitor. Since the value of the crosstalk voltage varies depending on the pixel potential, it is represented by a difference between the maximum and minimum values of the pixel potential variation FIG. 3 also shows the value including a voltage variation of switching transistors used in the driving circuit, other than the switching transistor 21 for the pixels.

The crosstalk voltage due to the signal line 15 indicates the variation of the pixel potential due to the coupling capacitance between the pixel electrode 45 and the signal line 15, and it is represented by a potential difference generated due to the variation of the potential of the signal 15 during the pixel potential is maintained in the OFF state of the switching transistor 21.

In FIG. 3, a curve (a) shows a crosstalk voltage due to the scanning line in the case of a liquid crystal display device driven by NTSC system and having 640×480 pixels, and a curve (b) shows a crosstalk voltage due to the scanning line in the case of a liquid crystal display device driven by high definition system and having 1840×1035 pixels.

The crosstalk voltage due to the scanning line changes depending on the pixel potential, and influences on the linearity of the pixel potential. However, influence of the crosstalk voltage exerted on the quality of the image is relatively small, and an allowable value thereof is about 0.6 (V). According to the liquid crystal display device 1 of this embodiment, as is understood from the curves (a) and (b) of FIG. 3, the crosstalk voltage satisfies the allowable value in both pixel pitches.

A curve (c) of FIG. 3 shows a crosstalk voltage due to the coupling capacitance by the signal line. In the liquid crystal display device 1, specifically, the drain region 23b of the switching transistor 21 is placed on the same side as the signal line 15 with respect to the opaque conductive film 41, so that the coupling capacitance is generated in these portions and the coupling capacitance between the pixel electrode 45 and the signal line 15 does not become 0. Therefore, if the pixel pitch is small, the distance between the drain region 23b and the signal line 15 is also small, and the coupling capacitance is increased. Moreover, since the storage capacitance is decreased, the crosstalk voltage is rapidly increased. However, according to the above embodiment, if the pixel pitch is set to 8 µm or more, the crosstalk voltage fully satisfies the allowable value of about 0.1 (V).

In a case where the pixel pitch is set to 8 µm or less, the crosstalk voltage due to the signal line 15 can be further reduced by further increasing the distance between the drain region 23b and the signal line 15.

Figure 4:
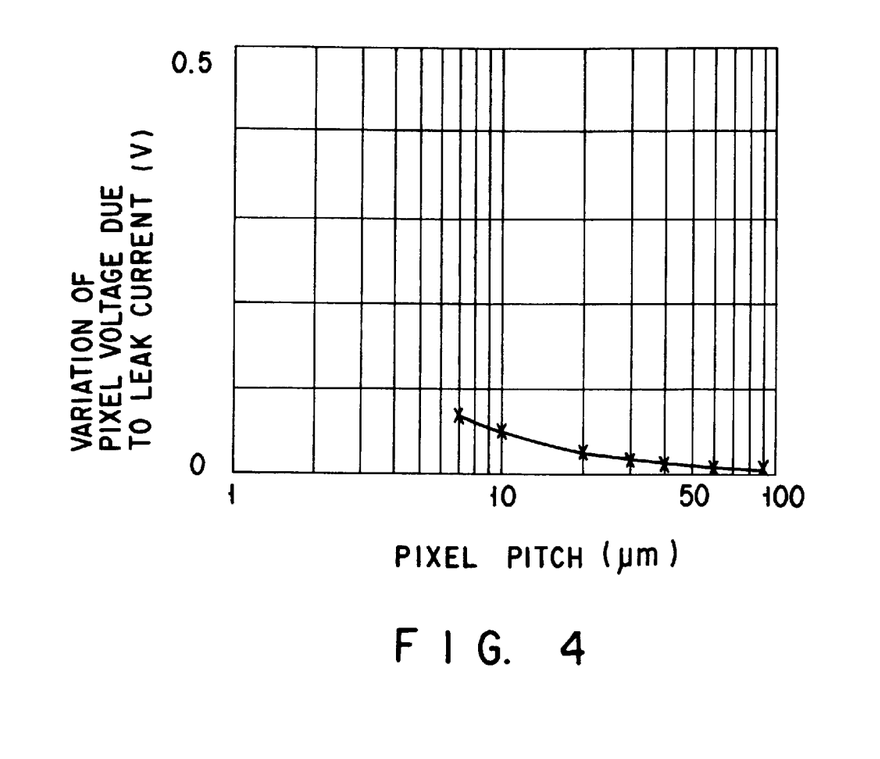
FIG. 4 is a view showing the relationship between variation of a pixel voltage due to a leak current and the pixel pitch.

FIG. 4 shows dependence of the pixel pitch on the pixel potential variation due to the leak current of the switching transistor. In this case, maintaining time is 1/60 (sec).

If the pixel pitch is smaller, the storage capacitance is smaller and the pixel potential variation due to the leak current becomes larger. The allowable value of the pixel potential variation due to the leak current is about 0.1 (V). However, according to the liquid crystal display device 1 of this embodiment, there is no problem even if the pixel pitch is an extremely fine pitch within the range of about 7 µm.

Generally, the amount of the storage capacitance is set to a value, which is necessary to suppress the crosstalk between the signal line 15 and the pixel electrode, and it is considered that a suitable value is about twice to ten times larger than the liquid crystal capacitance. However, in this embodiment, since the crosstalk between the signal line 15 and the pixel electrode is suppressed by using the pixel structure as mentioned above, the same technical advantage can be obtained even if the amount of the storage capacitance is small.

Figure 5:
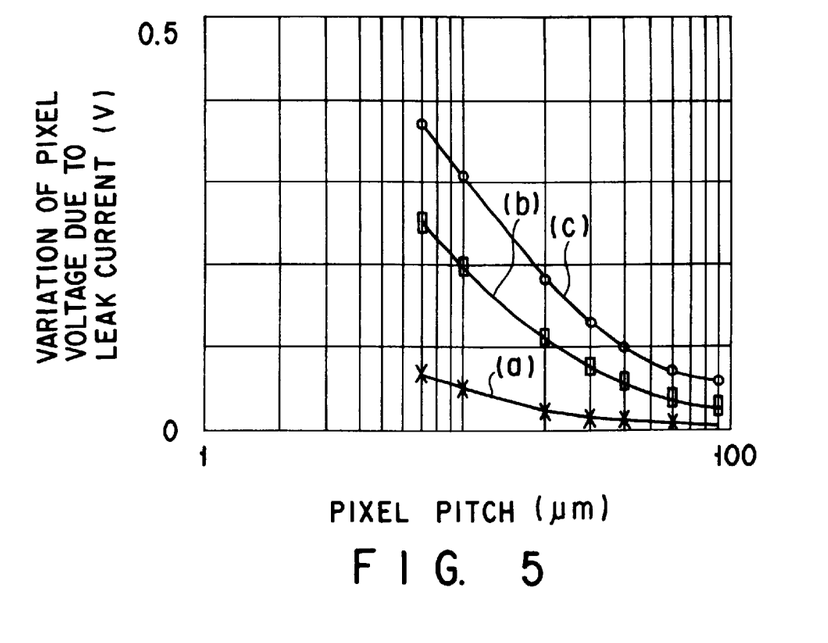
FIG. 5 is a view showing the relationship between the variation of the pixel voltage due to the leak current and the pixel pitch when a storage capacitance is changed.

FIG. 5 shows dependence of the pixel pitch on the pixel potential variation due to the leak current when the ratio of the storage capacitance to the liquid crystal capacitance is changed.

In FIG. 5, curves (a), (b) and (c) show the relationship between the pixel potential variation due to the leak current and the pixel pitch in cases wherein the storage capacitance is 8.3, one, and 0.1 times larger than the liquid crystal capacitance value in the liquid crystal display device 1 of the above-mentioned embodiment, respectively.

In a case that the value of the storage capacitance is smaller than that of the liquid crystal capacitance by making the interlayer insulating film thick or by reducing the overlapped area where the pixel electrode 45 and the transparent conductive film 41 overlap with each other in order to improve the aperture ratio, the pixel voltage variation cannot satisfy the allowable value if the pixel pitch becomes small. However, as shown in the curve (c) of FIG. 5, according to the structure of this embodiment, even if the value of the storage capacitance is smaller than that of the liquid crystal capacity, the pixel voltage variation can satisfy the allowable value if the pixel pitch is 50 $\mu$m or more.

Figure 6:
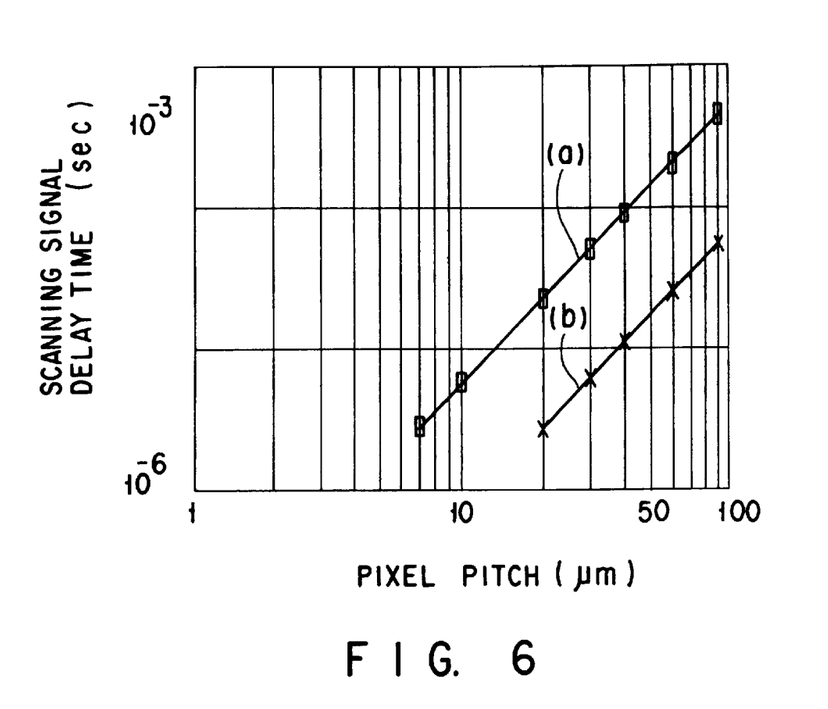
FIG. 6 is a view showing the relationship between a scanning signal delay time and the pixel pitch.

FIG. 6 shows dependence of the pixel pitch relating to scanning signal delay time in the structure of this embodiment. In the figure, a curve (a) shows a case of high definition system, and a curve (b) shows a case of NTSC system. In this case, it is assumed that the driving circuit is provided on only one side of the panel, and scanning signal delay time is set to be three times as long as time-constant obtained from CR product, and wiring resistance is set to be a sheet resistance of 50 ($\Omega/\square$).

If the video signal is supplied to each signal line in turn (point-a-time), an allowable value of the scanning signal delay time is about 70 ($\mu$sec) in the case of the NTSC system, and about 30 ($\mu$sec) in the case of the high definition system.

If the pixel pitch is small, the wire resistance value is unchanged since the W/L ratio is constant. However, the scanning signal delay time becomes short as the pixel pitch becomes small since the wire capacity value is reduced in proportion to the area of the wiring section. Therefore, this embodiment is very useful in a case wherein the pixel pitch is made small. Conversely, if the pixel pitch is made large, as indicated by the curves (a) and (b) in FIG. 6, the rise time can be ensured in the case of the NTSC system even if the pixel pitch is 100 $\mu$m, and the rise time cannot be fully ensured in the case of the high definition system if the pixel pitch is about 20 $\mu$m or less.

In a case wherein a liquid crystal display device, which has the pixel pitch of 20 $\mu$m or more and is driven by the high definition system, is structured according to this embodiment, it is useful to reduce the sheet resistance of the scanning line 17. If the gate line has a multilayered structure formed of polysilicon, tungsten silicide, and the like, breakage of the gate line can be securely prevented, thereby improving the reliability of the device. In order to reduce the sheet resistance, it is effective to use, as the gate electrode, a silicide such as tungsten, titanium, and the like or metallic material such as Mo—Ta in place of the polysilicon admixed with an impurity, which is used in the above embodiment.

Figure 7:
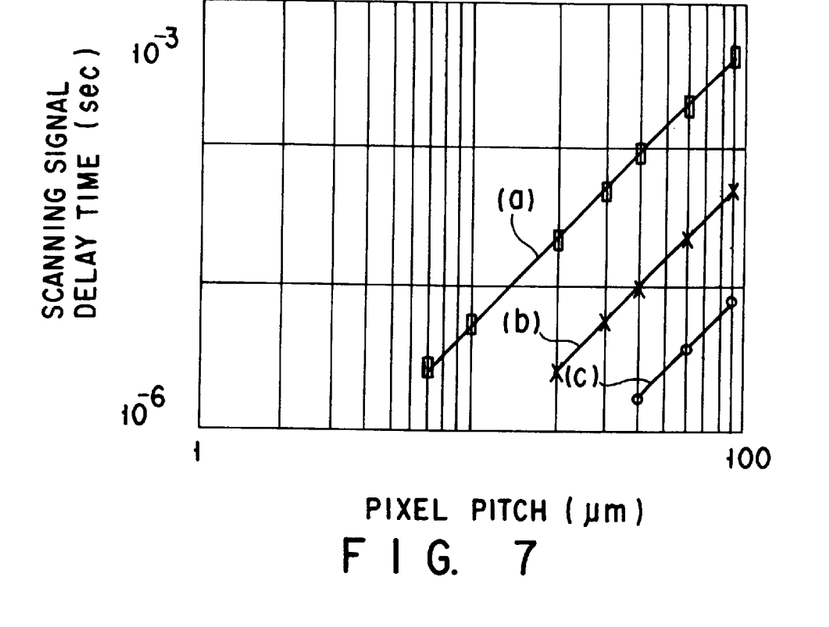
FIG. 7 is a view showing the relationship between the gate scanning delay time and the pixel pitch when wiring material for gate lines is changed.

FIG. 7 shows dependence of the pixel pitch with respect to the scanning signal delay in the structure of this embodiment. In the figure, similar to the curves (a) and (b) of FIG. 6, curves (a) and (b) show characteristics of liquid crystal display devices which have scanning lines formed of polysilicon and driven by the high definition system and the NTSC system, respectively. In FIG. 7, a curve (c) shows the characteristic of a liquid crystal display device which has a metal gate having sheet resistance of 1 ($\Omega/\square$) and driven by the high definition system.

As shown in FIG. 7, if a low resistance film is as the scanning line, the gate rise time can be sufficiently ensured by the pixel pitch of about 100 $\mu$m even in the high definition system.

Figure 8:
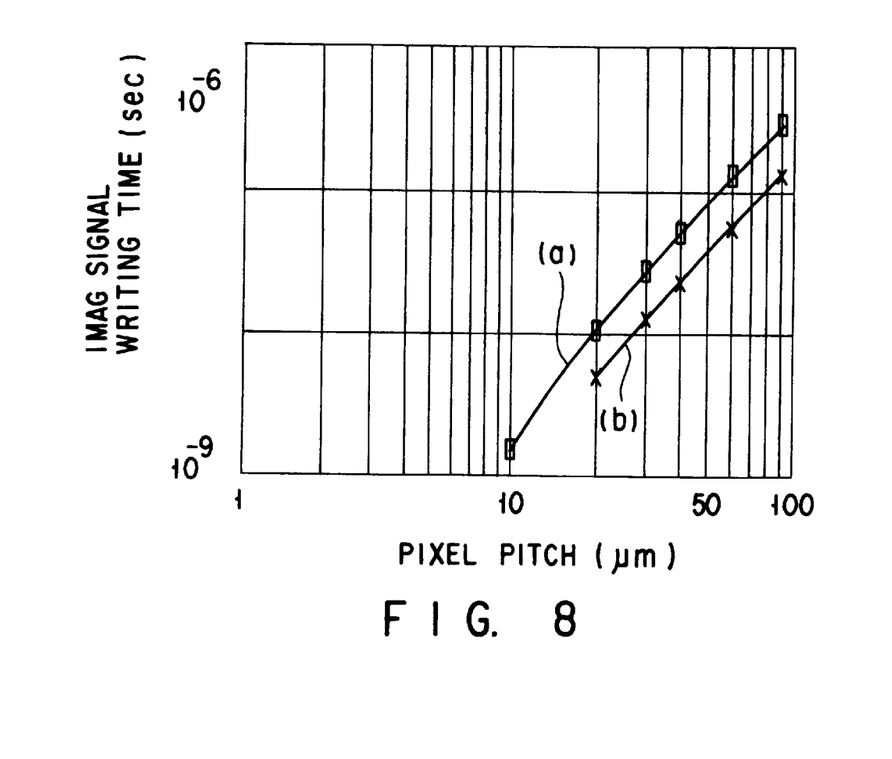
FIG. 8 is a view showing the relationship between an image signal writing time and the pixel pitch.

FIG. 8 shows dependence of the pixel pitch on the image signal writing time. In this figure, curves (a) and (b) show cases of the high definition system and the NTSC system, respectively. Upon writing an image signal into the pixel electrode 45, it is necessary that the image signal is written to the signal line 15 by means of the switching transistor in the driving circuit for the main scanning direction and then the potential of the signal line 15 is written to the pixel electrode 45 through the switching transistor 21 provided in the pixel. The image signal writing time is set to be three times as long as a constant time obtained from CR product based on the former writing time (writing time for writing the image signal into the signal line).

Similar to the gate voltage rise time, if the pixel pitch is smaller, the wire capacity value is reduced in proportion to the area of the wiring section. Thus, the writing time is shortened in accordance with decrease in the pixel pitch. In consideration of the point-a-time driving, an allowable value of the writing time is about 100 (nsec) in the case of the NTSC system, and about 13.5 (nsec) in the case of the high definition system.

As indicated by the curve (b) in FIG. 8, in the NTSC system, the scanning signal delay time can be ensured if the pixel pitch is about 70 $\mu$m or less. However, in the high definition system, as shown by the curve (a), a sufficient writing time cannot be ensured if the pixel pitch is not set to be about 20 $\mu$m or less.

Here, in order to achieve the pixel pitch of 20 $\mu$m or more in the high definition system, it can be considered that the allowable value of the image signal writing time is increased, for example, by using a line-a-time driving as the scanning method or by divisionally driving the driving circuit for the main scanning direction. In consideration of the divisional driving, for example, eight-divided driving, the allowable value of the writing time (ON time of the switching transistor in the driving circuit for the main scanning direction) is 13.5×8=108 (nsec), and a sufficient writing time can be ensured even if the pixel pitch is about 60 (nsec).

As described above, according to the liquid crystal display device of this embodiment, excellent characteristics can be ensured by the special structure even if the pixel pitch is minute.

Figure 9:
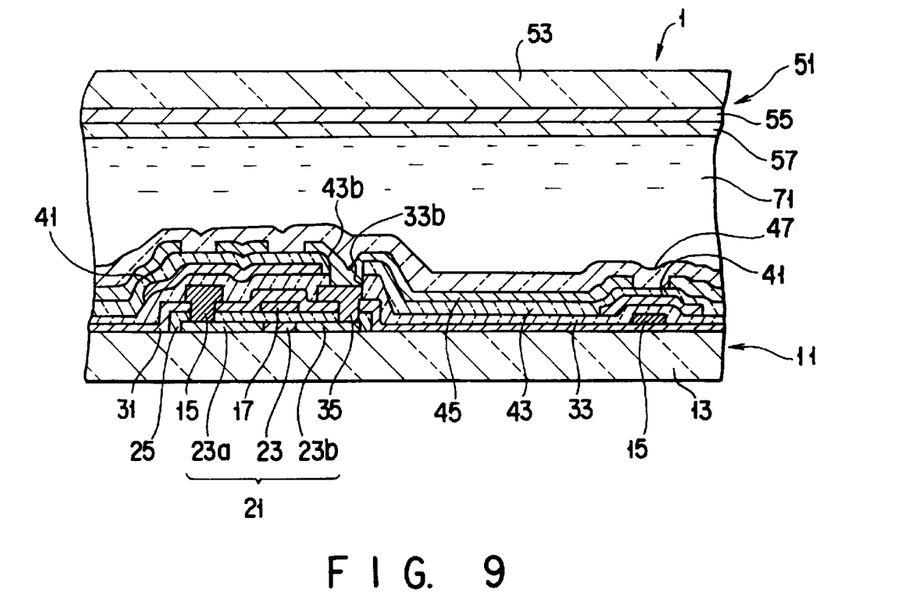
FIG. 9 is a schematic cross sectional view showing a modification of the first embodiment, corresponding to FIG. 2.

FIG. 9 will explain a liquid crystal display device according to a modification of the present invention. In FIG. 9, the same reference numerals as in the above-mentioned embodiment show the same portions as in the above embodiment, and their detailed explanation will be omitted.

In the liquid crystal display device of the above first embodiment, the contact holes for connecting the drain region 23b of the switching transistor 21 with the pixel electrode 45 is not shielded by the opaque conductive film 41. Since the areas of the contact holes are minute, the contact holes are not optically influenced. However, according to this modification, an opaque connecting section 35, which is manufactured in the same process as the signal line 15, is provided between the pixel electrode 45 and the drain region 23b in the contact holes. Therefore, the contact holes are light-shielded by the opaque connecting section 35. In order to improve the rectification ability of the device, the opaque connecting section 35 may have a multilayered structure with a silicide film such as a tungsten silicide and the like.

In the first embodiment and the modification, the storage capacitor is formed between the pixel electrode 45 and the opaque conductive film 41. However, if it is required that the storage capacitance is increased for reason that leak current of the switching transistor 21 is large, the storage capacitor may be formed by use of a gate oxide film whose thickness can be easily thinned. A modification of this case will be explained with reference to FIG. 10.

Figure 10:
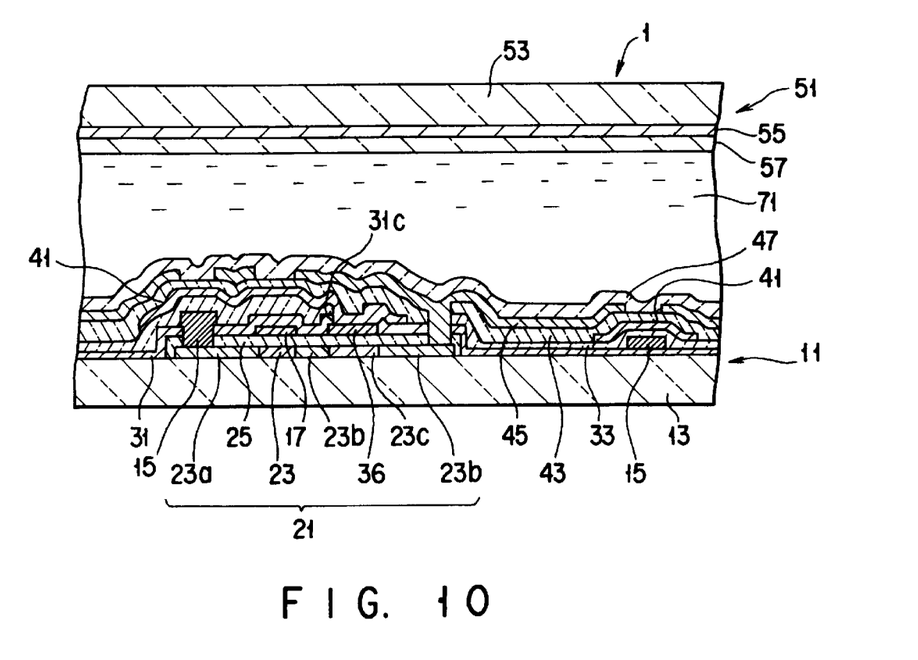
FIG. 10 is a schematic cross sectional view showing another modification of the first embodiment, corresponding to FIG. 2.

The active layer 23c electrically connected to the pixel electrode 45 is opposite to the opaque connecting section 36 through the gate insulating film, and a MOS capacity is formed between the connecting section 36 and the pixel electrode 45. The opaque connecting section 36, which is an electrode on the upper side of the MOS capacitance, is formed of a polysilicon thin film, which is manufactured by the same process as that for the scanning line 17, and to which impurity is doped. Then, the transparent connecting section 36 is connected to the transparent conductive film 41 through a contact hole 31c formed in the first interlayer insulating film 31. Depending on the driving method, it is necessary to use a capacity with a MIM structure. In this case, an impurity may be doped to that portion of the semiconductor thin film which constitutes the capacity, by an ion-implantation in advance, so as to have a low resistance.

Regarding the driving circuit for driving the liquid crystal display device of the above embodiment, since it is difficult to connect the driving circuit to each electrode if the pixel pitch is small, it is needed that the driving circuit be integrally formed in the liquid crystal display device. In order to form the driving circuit integrally with the liquid crystal display device, there is a need for sufficiently high mobility for realizing an operating speed required for the transistor constituting the driving circuit. The polysilicon transistor used in this embodiment can satisfy the requirement. Therefore, according to this modification, the liquid crystal display device in which the driving circuit is integrally formed can be easily manufactured.

Figure 11:
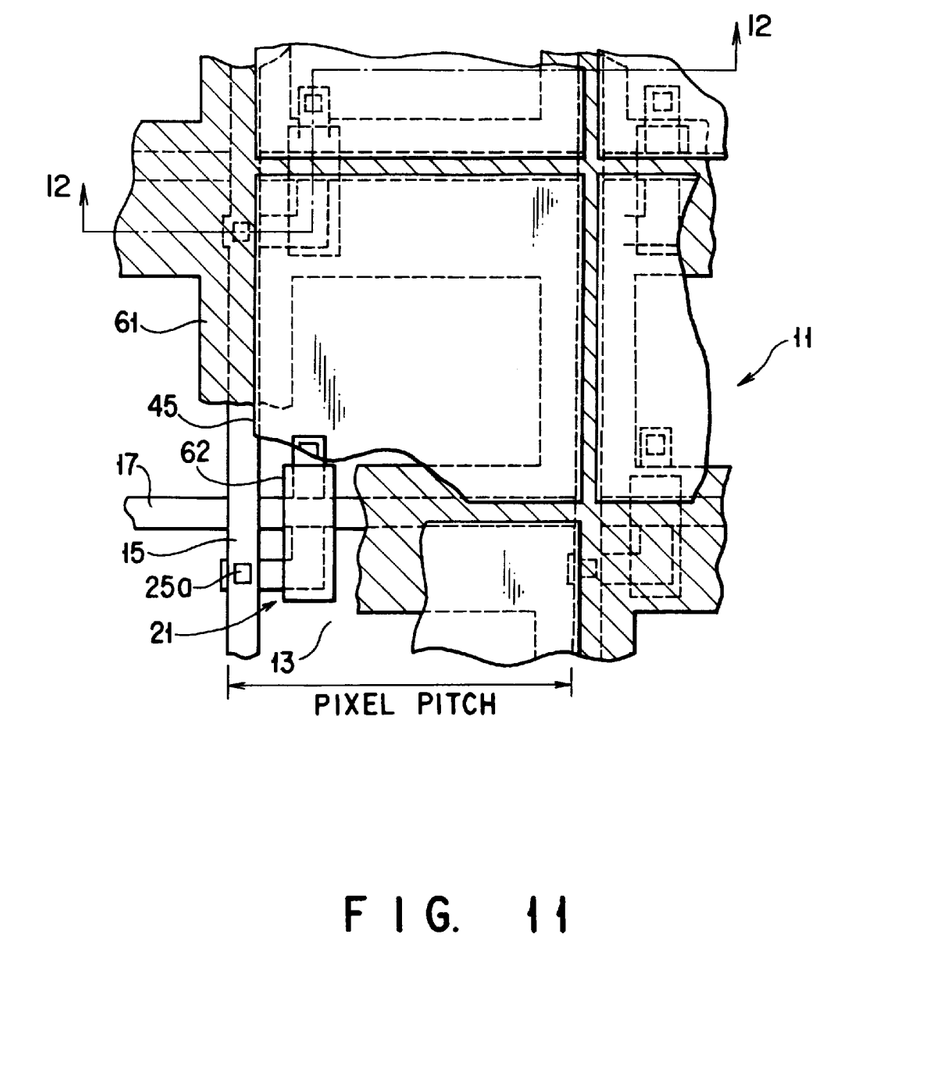
FIG. 11 is a plane view of a part of an array substrate of a liquid crystal display device according to a second embodiment of the present invention, viewed from an opposing substrate side.
Figure 12:
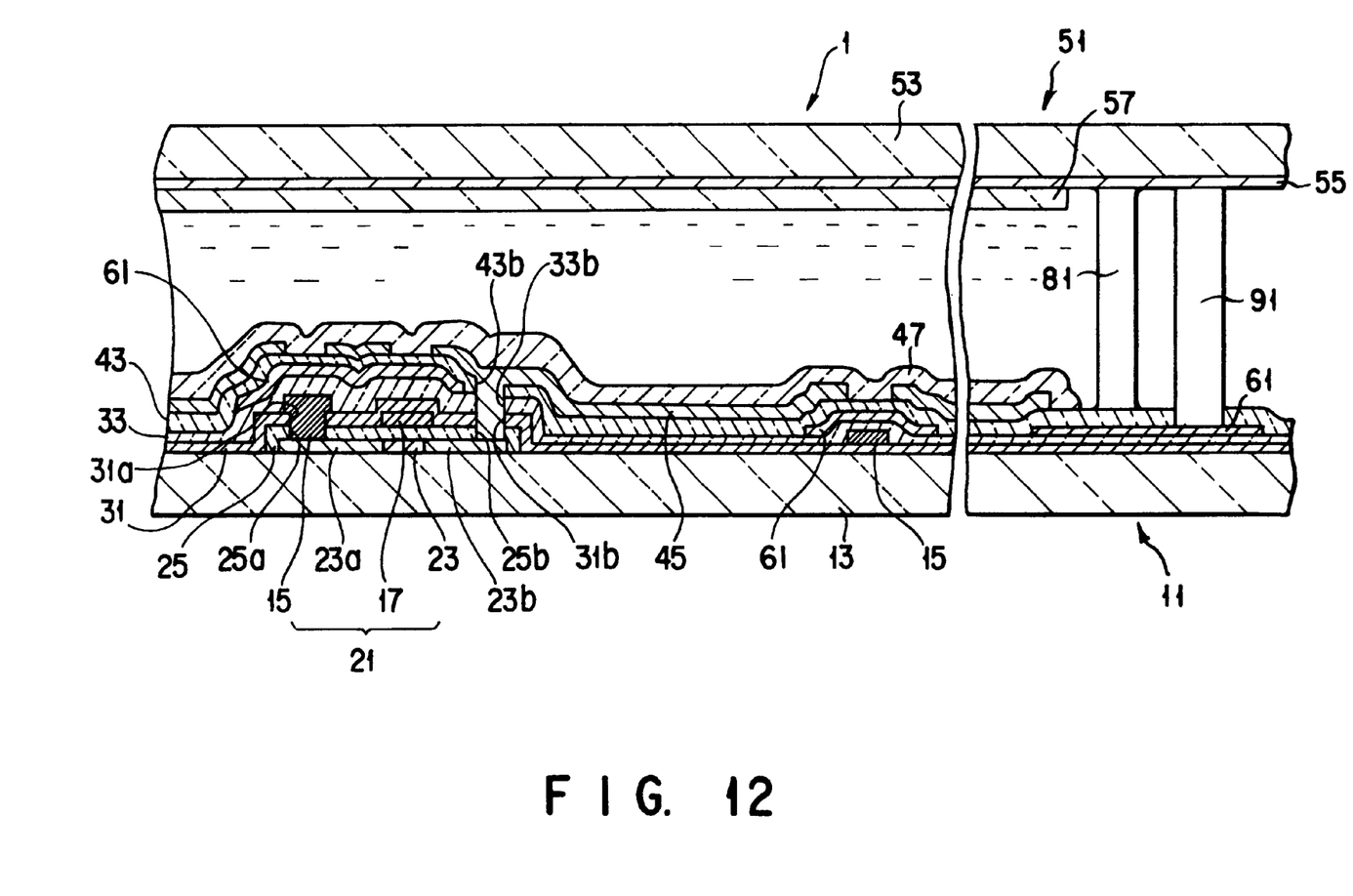
FIG. 12 is a schematic cross sectional view taken along a line 12—12 of FIG. 11.

FIGS. 11 and 12 show a liquid crystal display device 1 relating to a second embodiment of the present invention. In these figures, the same reference numerals as in the first embodiment represent the same portions as in the first embodiment, and their detailed explanation will be omitted.

According to the second embodiment, in place of the opaque conductive film 41 of the first embodiment, a transparent conductive film 61, serving as a conductive film of the present invention, is formed in a network pattern to cover the signal lines 15 and the scanning lines 17. Since the transparent conductive film 61 is transparent, and has no influence on the aperture ratio of the liquid crystal display device, the width of the transparent conductive film 61 is sufficiently larger than that of the opaque conductive film 41. Then, the transparent conductive film 61 is connected to the fixed potential (the opposing electrode potential).

Each pixel electrode 45 is arranged such that the edge portion thereof is overlapped on the signal lines 15 and the scanning lines 17, and the signal lines 15 and the scanning lines 17 are used as a light-shielding film or a black matrix. A part of each pixel electrode 45 is formed to overlap with the transparent conductive film 61 through the third interlayer insulating film 43, serving as an insulating film of the present invention, and the storage capacitor is formed by the overlapped portions.

In order to light-shield the switching transistor 21, a light-shielding film 62 is formed, by the same process as the signal lines 15, on the first interlayer insulating film 31 to cover the switching transistor. The shielding film 62 is formed so as to cover the channel section and that area of the switching transistor 21 which extends from the channel end toward the source region 23a and the drain region 23b by a distance corresponding to at least the diffused length of the minority carrier.

According to the above-structured second embodiment, the transparent conductive film 61 is provided between the signal lines and the pixel electrode and between the scanning lines and the pixel electrode. Due to this, similar to the first embodiment, the crosstalk between the signal lines and the pixel electrode and the crosstalk between the scanning lines and the pixel electrode can be prevented. Moreover, since the signal lines and the pixel electrode are electrically shielded from each other by the transparent electrode 61, the disorder of the orientation of liquid crystal, which is caused at the edge portion of the pixel electrode by the function of the lateral electrical field from the signal lines, can be made small to the extent that no influence is exerted on the quality of the image.

Moreover, the storage capacitor is formed by the overlapped portion where the transparent conductive film 61 and the pixel electrode overlap with each other. Therefore, since there is no need to provide separate storage electrodes, the aperture ratio of the device can be increased. Particularly, in the second embodiment, the storage capacitor is formed as a parallel plane capacitor which is formed by two-layered transparent films, that is, the transparent conductive film 61 and the transparent pixel electrode 45, so that the area forming the storage capacitor can be used as a pixel. Therefore, the aperture ratio can be greatly increased. Also, the storage capacitor forming area can be enlarged close to the pixel size, if necessary. By use of the transparent conductive film 61 in place of the conventional storage electrode formed of the polysilicon film to which an impurity is doped, the wire resistance is reduced, and the writing characteristic of the image signal voltage can be improved.

Furthermore, according to the second embodiment, each pixel electrode is formed such that the edge portion overlaps on the signal lines and the scanning lines, the signal lines and the scanning lines are used as a black matrix, and the light-shielding film 62 is formed on the switching transistor 21. Due to this, the black matrix can be made in the minimum size required, so that the aperture ratio can be further improved and the accuracy of alignment of the light-shielding film with the pixels can be improved. Moreover, since there is no need to provide a separate black matrix and a light-shielding film on the opposing substrate 51, it is not necessary to align the array substrate 11 with the opposing substrate 51 with a high precision. Therefore, the manufacturing process of the liquid crystal display device can be simplified.

Figure 13:
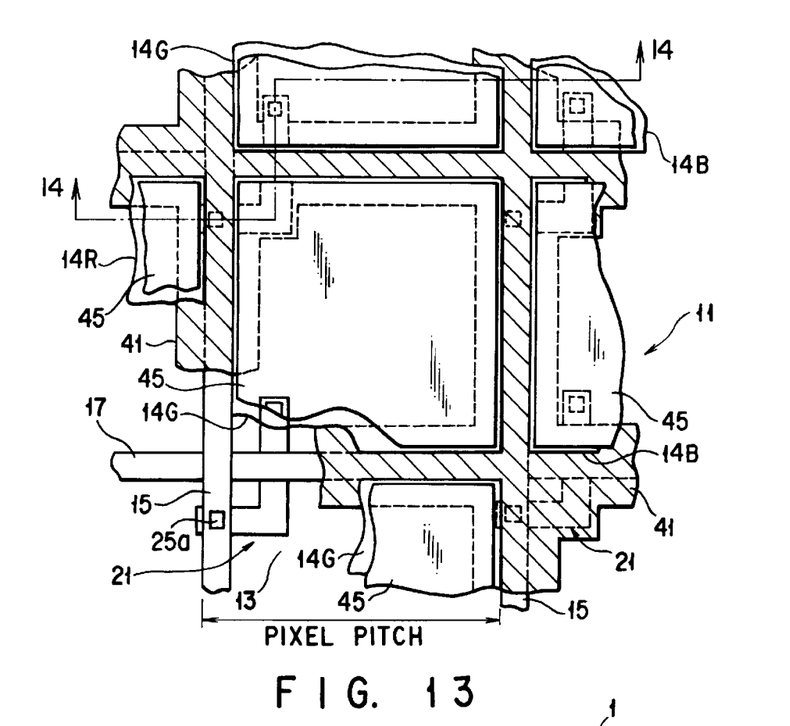
FIG. 13 is a plane view of a part of an array substrate of a liquid crystal display device according to a third embodiment of the present invention, viewed from an opposing substrate side.
Figure 14:
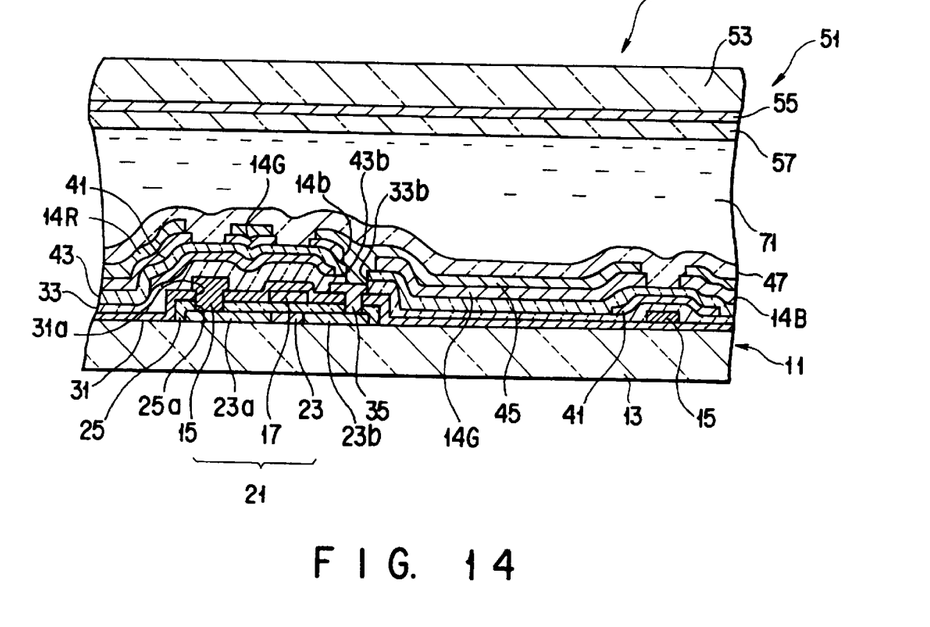
FIG. 14 is a schematic cross sectional view taken along a line 14—14 of FIG. 13.

FIGS. 13 and 14 show a third embodiment in which the present invention is applied to a color liquid crystal display device. In these figures, the same reference numerals as in the first embodiment represent the same portions as in the first embodiment, and their detailed explanation will be omitted, and only the portions different from the first embodiment will be explained in detail.

According to the third embodiment, an opaque conductive film 41 with a network pattern is formed on the second interlayer insulating film 33 so as to cover the signal lines 15, the scanning lines 17, and the switching transistors 21. In each pixel region, one of three color filters 14R (Red), 14G (Green), and 14B (Blue), is disposed and these filters are arranged in the order of Red, Green, and Blue. Each of the color filters 14R, 14G, and 14B is formed to completely cover the opening portion of the corresponding pixel region, that is, the portion which is not shielded by the black matrix formed of the opaque conductive film 41. In this embodiment, each size of the color filters 14R, 14G, and 14B is the same as the pixel size, and the edge portion of each color filter overlaps with the opaque conductive film 41 to sandwich the third interlayer insulating film 43 therebetween.

The color filters 14R, 14G, and 14B may be formed by various method such as printing, electrodeposition, and the like. The electrodeposition is useful to form the filter in each minute pixel with a high accuracy.

The pixel electrode 45 formed of ITO is formed on each of the color filters 14R, 14G, and 14B, and the edge portion of the pixel electrode overlaps with the opaque conductive film 41 to sandwich the color filter and the third interlayer insulating film 43 therebetween. The pixel electrode 45 is electrically connected to the switching transistor 21 through contact holes 14b, 33b, and 43b, which are formed in the color filter, second and third interlayer insulating films 33, 43, and the transparent connecting section 35.

Although the heat resistance of the color filter differs depending on a material to be used, a suitable heat resistance of the color filter is 250° C. to 300° C. On the other hand, in a case where the switching transistor 21 is formed by use of a high temperature process which can manufacture a switching transistor having a stable characteristic, for example, the formation of the gate insulating film is performed at 900° C., the solid-phase-crystallization is performed at 600° C., and sintering of the aluminum film is performed at 450° C. The treating temperatures in most processes exceed the suitable heat resistance temperature of the color filter. Due to this, it is necessary to perform the formation of the color filters after the manufacturing of the switching transistor by the high temperature process.

According to the above-mentioned third embodiment, there can be obtained the same technical advantages as those of the first embodiment in terms of the reduction of the crosstalk among the signal and scanning lines, and the pixel electrode, the reduction of the disorder of the orientation of the crystal liquid due to the lateral electrical field from the signal lines, and the improvement of the aperture ratio. Moreover, the color filters 14R, 14G, and 14B are formed on the array substrate. Thus, as compared with the case wherein the color filters are formed on the opposing substrate, the color filters can be aligned with the pixels with a high accuracy without misalignment. Therefore, there can be provided a color liquid crystal display device having a high quality of image and a high precision. At the same time, since there is no need that the array substrate and the opposing substrate are aligned with a high accuracy, the liquid crystal display device is easily manufactured. In a case that the color filters are provided between the pixel electrodes and the transparent conductive film, there is no voltage drop of the pixel electrodes caused by the color filters, and loss of the applied voltage can be prevented.

In the third embodiment, each color filter may be formed on the pixel electrode 45. In this case, there can be obtained a technical advantage in which the pixel electrode can be easily connected to the switching transistor.

The present invention is not limited to the above-mentioned embodiments, and various modifications can be made within the scope of the invention. For example, in the above embodiments, the opaque conductive film or the transparent conductive film is formed to cover both the signal lines and the scanning lines. However, if the opaque or transparent conductive film is formed to cover at least either the signal lines or the scanning lines, there can be obtained the technical advantages such as the reduction of the crosstalk, the reduction of the disorder of the orientation of the crystal liquid due to the lateral electrical field, improvement of the aperture ratio, and enlargement of the storage capacity.

Figure 15:
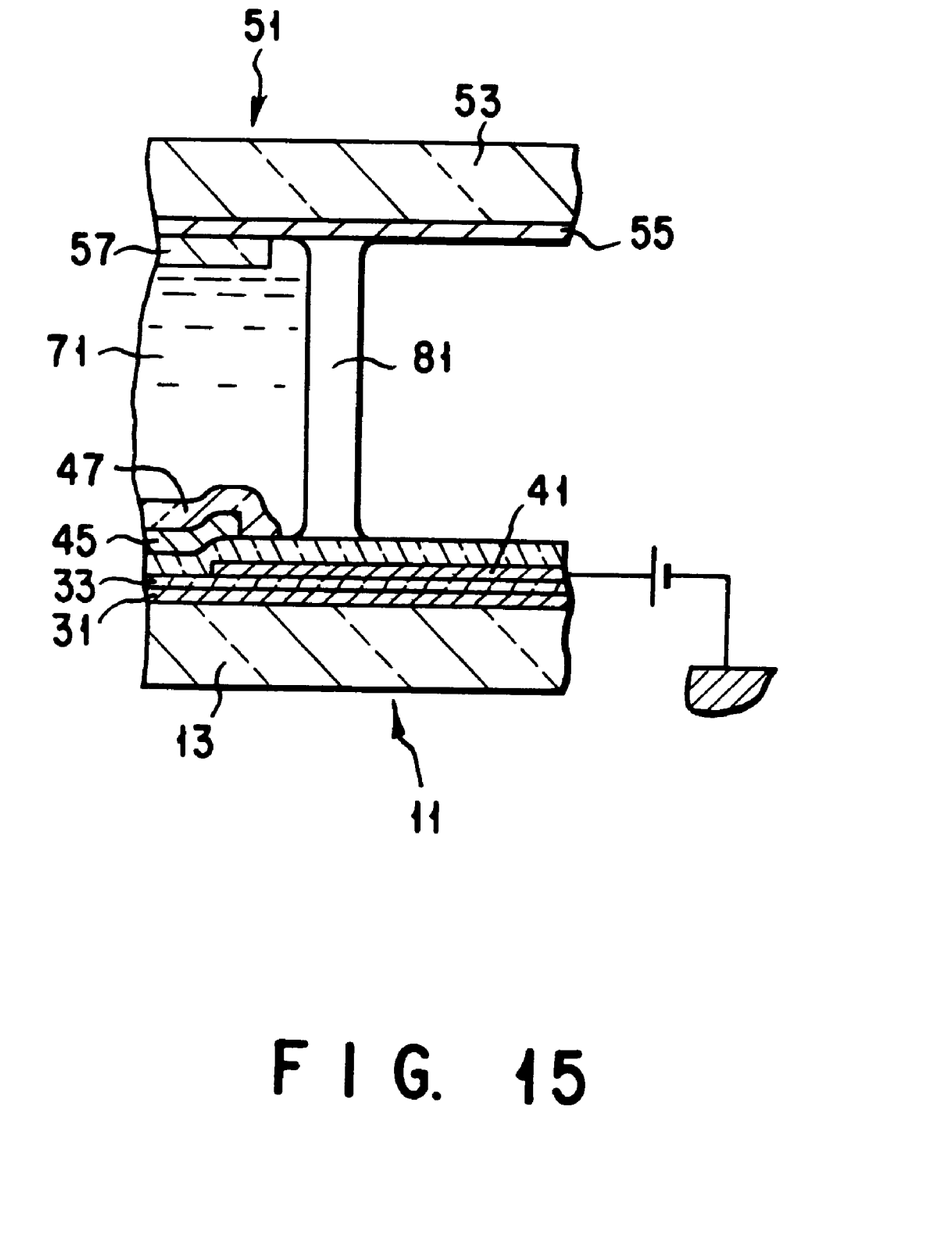
FIG. 15 is a schematic cross sectional view showing a modification of the present invention.

In the above mentioned embodiments, the opaque or transparent conductive film 41 or 61 has the same potential as that of the opposing electrode 55. In this case, the DC component of the voltage applied to the liquid crystal layer 71 can be suppressed, so that degradation of the liquid crystal layer 71 can be prevented. However, according to the present invention, the opaque or transparent conductive film 41 or 61 may be connected a constant potential, as shown in FIG. 15.

The above embodiments explained the transmission type liquid crystal display device. However, the present invention can be applied to a reflection type liquid crystal display device. Upon applying the present invention to a reflection type liquid crystal display device, the pixel electrode 45 is formed of an opaque conductive film and used as a reflection film. Due to this, even in the case wherein the conductive film for covering the signal lines 15, the scanning lines 17, and the switching transistors 21 through the insulating film is formed of a transparent conductive film, there is no need to provide shielding films for covering the switching transistors.

As mentioned above, according to the liquid crystal display device of the present invention, crosstalk from the signal and scanning lines can be reduced, and the disorder of the liquid crystal orientation caused by the lateral electrical field from the wirings can be reduced. Moreover, the parallel plane capacitor is formed between the conductive film and the pixel electrode through the insulating film and used as a storage capacitance, so that a separate storage electrode can be omitted and the aperture ratio can be improved. Therefore, according to the present invention, there can be provided a liquid crystal display device having a small pixel size and good characteristics.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:
   a first electrode substrate having a plurality of signal lines and a plurality of scanning lines disposed in a matrix manner, and a plurality of pixel electrodes, each of the pixel electrodes being connected to at least one of the signal lines and at least one of the scanning lines via a switching element, said switching element having an active layer composed of a polycrystalline silicon film, said first electrode substrate including:
- an opaque conductive film provided between the pixel electrodes and at least one of a plurality of said signal lines and a plurality of said scanning lines, for reducing coupling capacitance therebetween,
- a first insulating film provided between the conductive film and said at least one of the plurality of signal lines and the plurality of scanning lines, and
- a second insulating layer disposed between the conductive film and the pixel electrodes;

a second electrode substrate including an opposing electrode which is opposite to the pixel electrodes; and a liquid crystal layer sealed between the first and second electrode substrates.

2. A liquid crystal display device according to claim 1, further comprising means for applying a fixed potential to said opaque conductive film.

3. A liquid crystal display device according to claim 1, further comprising means for applying to said opaque conductive film a potential of the opposing electrode.

4. A liquid crystal display device according to claim 1, wherein said opaque conductive film has a plurality of open portions opposite said pixel electrodes.

5. A liquid crystal display device according to claim 1, wherein said first electrode substrate has a plurality of color filters opposing said pixel electrodes.

6. A liquid crystal display device according to claim 1, wherein said pixel electrodes are formed of a transparent conductive film, and said first electrode substrate can transmit light therethrough.

7. A liquid crystal display device according to claim 1, wherein said opaque conductive film is formed from at least one member selected from the group consisting of a chromium film, a silicide film, and an aluminum/chromium film.

8. A liquid crystal display device according to claim 1, wherein said pixel electrodes have a pitch, p, satisfying the following condition:

$$p \leq 100 \, \mu m.$$

9. A liquid crystal display device according to claim 1, wherein said active layer of said switching element includes a source region connected to one of the signal lines and a drain region connected to one of the pixel electrodes.

10. A liquid crystal display device according to claim 9, wherein at least one of said scanning lines is disposed on said active layer with a gate insulating film disposed therebetween.

11. A liquid crystal display device comprising:

a first electrode substrate having a plurality of signal lines and a plurality of scanning lines disposed in a matrix manner, and a plurality of pixel electrodes, each of the pixel electrodes being connected to at least one of the signal lines and at least one of the scanning lines via a switching element, said first electrode substrate including:
- an opaque conductive film disposed between said pixel electrodes and said signal and scanning lines;
- a first insulating layer; and
- a second insulating layer;
- wherein said conductive film overlaps peripheral areas of said pixel electrodes, and reduces capacitance between said pixel electrodes and said signal and scanning lines;

a second electrode substrate having an opposing electrode opposite to said pixel electrodes; and a liquid crystal layer sealed between said first and second electrode substrates.

12. A liquid crystal display device according to claim 11, wherein said opaque conductive film covers the signal and scanning lines with said first insulating layer disposed therebetween.

13. A liquid crystal display device according to claim 11, wherein said opaque conductive film covers the switching element.

14. A liquid crystal display device according to claim 13, wherein an aperture ratio is determined by the opaque conductive film.

15. A liquid crystal display device according to claim 11, wherein said second insulating layer is disposed between said conductive film and said pixel electrodes.

16. A liquid crystal display device comprising:

a first substrate having a plurality of signal lines and a plurality of scanning lines disposed in a matrix manner, and a plurality of pixel electrodes, each of the pixel electrodes being connected to at least one of the signal lines and at least one of the scanning lines via a switching element having an active layer, said active layer of said switching element including a source region connected to one of the signal lines and a drain region connected to one of the pixel electrodes, and at least one of said scanning lines being disposed on said active layer with a gate insulating film disposed therebetween, said first substrate including:
- an opaque conductive film disposed above said scanning lines and signal lines via a first insulating layer and disposed below said pixel electrodes via a second insulating layer;
- wherein said conductive film overlaps peripheral areas of said pixel electrodes, and reduces capacitance between said pixel electrodes and said signal and scanning lines.

17. A liquid crystal display device according to claim 16, further comprising means for applying a fixed potential to said opaque conductive film.

18. A liquid crystal display device according to claim 17, further comprising means for applying a potential of the opposing electrode to said opaque conductive film.

19. A liquid crystal display device according to claim 16, wherein said opaque conductive film has a plurality of open portions opposite to said pixel electrodes.

20. A liquid crystal display device according to claim 16, wherein said first substrate has a plurality of color filters opposing said pixel electrodes.

21. A liquid crystal display device according to claim 16, wherein said pixel electrodes are formed of a transparent conductive film, and said first substrate is capable of transmitting light therethrough.

22. A liquid crystal display device according to claim 16, wherein said opaque conductive film is formed from at least one member selected from the group consisting of a chromium film, a silicide film, and an aluminum/chromium film.

23. A liquid crystal display device according to claim 16, wherein said pixel electrodes have a pitch, p, satisfying the following condition:

$$p \geq 100 \, \mu m.$$

24. A transmission type liquid crystal display device comprising:

a first transparent electrode substrate having a plurality of signal lines and scanning lines arranged in a matrix manner, and a plurality of transparent pixel electrodes each connected to one of the signal lines and one of the scanning lines through a switching element;

a second transparent electrode substrate having a transparent opposing electrode which is opposite to the transparent pixel electrodes; and a liquid crystal layer sealed between the first and second transparent electrode substrates;

each of the signal lines being disposed between two adjacent transparent pixel electrodes;

said first transparent electrode substrate having an opaque conductive film provided between said two adjacent pixel electrodes and the corresponding one of the signal lines through an insulating film, for reducing coupling capacitance between said two adjacent transparent electrodes and the corresponding one of the signal lines; and said opaque conductive film being provided so that only an outer peripheral portion of each pixel electrode overlaps with the conductive film.

25. A transmission type liquid crystal display device according to claim 24, wherein said opaque conductive film has a plurality of opening portions opposite to the transparent pixel electrodes, respectively.

26. A transmission type liquid crystal display device comprising:

a first transparent electrode substrate having a plurality of signal lines and scanning lines arranged in matrix manner, and a plurality of transparent pixel electrodes each connected to one of the signal lines and one of the scanning lines through a switching element;

a second transparent electrode substrate having a transparent opposing electrode which is opposite to the transparent pixel electrodes; and a liquid crystal layer sealed between the first and second transparent electrode substrates;

each of the scanning lines being disposed between two adjacent transparent pixel electrodes;

said first transparent electrode substrate having an opaque conductive film provided between said two adjacent pixel electrodes and the corresponding one of the scanning lines through an insulating film, for reducing coupling capacitance between said two adjacent transparent electrodes and the corresponding one of the scanning lines; and said opaque conductive film being provided so that only an outer peripheral portion of each pixel electrode overlaps with the conductive film.

27. A transmission type liquid crystal display device according to claim 26, wherein said opaque conductive film has a plurality of opening portions opposite to the transparent pixel electrodes, respectively.

* * * * *